United States Patent
Blaha et al.

(10) Patent No.: US 7,685,440 B2
(45) Date of Patent: Mar. 23, 2010

(54) SWITCH WITH FULLY ISOLATED POWER SOURCING EQUIPMENT CONTROL

(75) Inventors: Matthew Blaha, Holmdel, NJ (US); Patrick J. Quirk, Huntsville, AL (US)

(73) Assignee: Agere Systems Inc., Allentown, PA (US)

( * ) Notice: Subject to any disclaimer, the term of this patent is extended or adjusted under 35 U.S.C. 154(b) by 606 days.

(21) Appl. No.: 11/369,057

(22) Filed: Mar. 6, 2006

(65) Prior Publication Data

US 2007/0019445 A1    Jan. 25, 2007

Related U.S. Application Data

(60) Provisional application No. 60/706,512, filed on Jul. 21, 2005.

(51) Int. Cl.
*G06F 1/26* (2006.01)

(52) U.S. Cl. .................... 713/300; 710/303

(58) Field of Classification Search ............ 710/11, 710/14, 38, 131, 132, 300, 303, 315; 370/204, 370/213, 401, 437, 258, 356; 375/222, 134, 375/257, 260; 307/104, 412; 713/300, 310, 713/320, 340
See application file for complete search history.

(56) References Cited

U.S. PATENT DOCUMENTS

| | | | |
|---|---|---|---|
| 4,004,104 A | 1/1977 | Picandet et al. | 179/70 |
| 4,761,702 A | 8/1988 | Pinard | 361/18 |
| 5,138,543 A | 8/1992 | Harm et al. | 363/21.08 |
| 5,305,192 A | 4/1994 | Bonte et al. | 363/21.16 |
| 5,402,329 A | 3/1995 | Wittenbreder | 363/16 |
| 5,461,303 A | 10/1995 | Leman et al. | 323/222 |
| 5,757,625 A | 5/1998 | Schoofs | 363/21.13 |

(Continued)

FOREIGN PATENT DOCUMENTS

DE    103 32 841 A1    2/2005

(Continued)

OTHER PUBLICATIONS

LT1737 Data Sheet, Linear Technology Corporation, Jun. 6, 2005, pp. 1-28.

(Continued)

*Primary Examiner*—Rajnikant B Patel
(74) *Attorney, Agent, or Firm*—Mendelsohn, Drucker & Associates, P.C.; Steve Mendelsohn (57) ABSTRACT

In one embodiment, the invention is an apparatus (e.g., an Ethernet switch) having an isolated side and a line side. A line-side connector is connectable to a cable. An isolated-side physical-layer module (1) is electrically coupled to the connector via a signal-isolation transformer and (2) processes signals transmitted over the cable. A line-side power conditioning module (1) is electrically coupled to an isolated-side power switcher via a power-isolation transformer that converts an AC power signal received from the power switcher into a transformed AC power signal and (2) converts the transformed AC power signal into a cable power signal to be supplied via the connector to the cable in order to power a cable-powered device connected to the cable. An isolated-side control module performs a detection function in which the control module determines whether or not a cable-powered device is connected to the cable.

20 Claims, 9 Drawing Sheets

U.S. PATENT DOCUMENTS

| | | | |
|---|---|---|---|
| 5,991,172 A | 11/1999 | Jovanovic et al. | 363/21.14 |
| 6,343,026 B1 | 1/2002 | Perry | 363/65 |
| 6,640,308 B1 | 10/2003 | Keyghobad et al. | 713/300 |
| 6,650,070 B1 | 11/2003 | Hudson et al. | 315/312 |
| 6,958,920 B2 | 10/2005 | Mednik et al. | 363/19 |
| 6,967,472 B2 | 11/2005 | Balakrishnan et al. | 323/284 |
| 6,972,969 B1 | 12/2005 | Shteynberg et al. | 363/21.12 |
| 6,995,991 B1 | 2/2006 | Yang et al. | 363/21.03 |
| 7,054,170 B2 | 5/2006 | Yang et al. | 363/21.18 |
| 7,057,907 B2 | 6/2006 | Oh | 363/21.05 |
| 7,061,780 B2 | 6/2006 | Yang et al. | 363/21.16 |
| 7,142,437 B2 | 11/2006 | Park | 363/18 |
| 7,196,503 B2 | 3/2007 | Wood et al. | 323/276 |
| 7,259,972 B2 | 8/2007 | Yang | 363/21.16 |
| 7,280,376 B2 | 10/2007 | McDonald et al. | 363/20 |
| 7,362,593 B2 | 4/2008 | Yang et al. | 363/21.16 |
| 7,471,522 B2 | 12/2008 | Ng et al. | 363/21.12 |
| 7,471,531 B2 | 12/2008 | Blaha et al. | 363/97 |
| 7,486,528 B2 | 2/2009 | Yang | 363/21.12 |
| 2003/0080723 A1 | 5/2003 | Chen et al. | 324/76.29 |
| 2005/0169017 A1 | 8/2005 | Muegge et al. | 363/21.15 |
| 2005/0285587 A1 | 12/2005 | Yang et al. | 324/103 P |
| 2006/0002155 A1 | 1/2006 | Shteynberg et al. | 363/21.12 |
| 2006/0034102 A1 | 2/2006 | Yang et al. | 363/21.13 |
| 2006/0056204 A1 | 3/2006 | Yang et al. | 363/10 |
| 2007/0019445 A1 | 1/2007 | Blaha et al. | 363/21.12 |
| 2007/0024213 A1 | 2/2007 | Shteynberg et al. | 315/291 |
| 2007/0070664 A1 | 3/2007 | Chen | 363/95 |
| 2008/0049459 A1 | 2/2008 | Blaha et al. | 363/21.16 |
| 2008/0071260 A1 | 3/2008 | Shores | 606/34 |
| 2008/0192514 A1 | 8/2008 | Zhou et al. | 363/21.12 |
| 2008/0238447 A1 | 10/2008 | de la Torre Vega et al. | 324/676 |

FOREIGN PATENT DOCUMENTS

| | | |
|---|---|---|
| JP | 2001203085 | 7/2001 |

OTHER PUBLICATIONS

L. Balogh, "A Practical Introduction to Digital Power Supply Control", Texas Instruments Incorporated, 2005, pp. 6-1 through 6-29. Downloaded from http://focus.ti.com/lit/ml/slup232.pdf, Apr. 5, 2006.

L. Dixon, "Control Loop Cookbook", Texas Instruments Incorporated, 2002, 41 pages. Downloaded from: http://focus.ti.com/lit/ml/slup113a/slup113a.pdf, Apr. 5, 2006.

K. Kittipeerachon, et al., "Feedback Compensation Design for Switched Mode Power Supplies with a Right-Half-Plane (RHP) Zero", Power Electronics, Machines and Drives, 2004, (PEMD 2004). Second International Conference on (Conf. Publ. No. 498), pp. 236-241.

Y-F. Liu, et al., "Digital Control of Switching Power Converters", Proc. of IEEE Conference on Control Applications, Toronto, Canada, Aug. 28-31, 2005, pp. 635-640.

A. Peterchev, et al., "Quantization Resolution and Limit Cycling in Digitally Controlled PWM Converters", IEEE Trans. on Power Electronics, vol. 18, No. 1, Jan. 2003, pp. 301-308.

"Introduction to Power Supplies", National Semiconductor Application Note 556, Sep. 2002, pp. 1-7. Downloaded from: http://www.efficientpowersupplies.org/pages/intro_to_power_supplies.pdf, Apr. 5, 2006.

SWITCH WITH FULLY ISOLATED POWER SOURCING EQUIPMENT CONTROL

CROSS-REFERENCE TO RELATED APPLICATIONS

This application claims the benefit of the filing date of U.S. provisional application No. 60/706,512, filed on Jul. 21, 2005, the teachings of which are incorporated herein by reference.

BACKGROUND OF THE INVENTION

1. Field of the Invention

The present invention relates to electronics, and, in particular, to Power Sourcing Equipment (PSE) for communication systems conforming to the IEEE 802.3 Ethernet and IEEE 802.3af Power over Ethernet (PoE) standards.

2. Description of the Related Art

Figure 1:
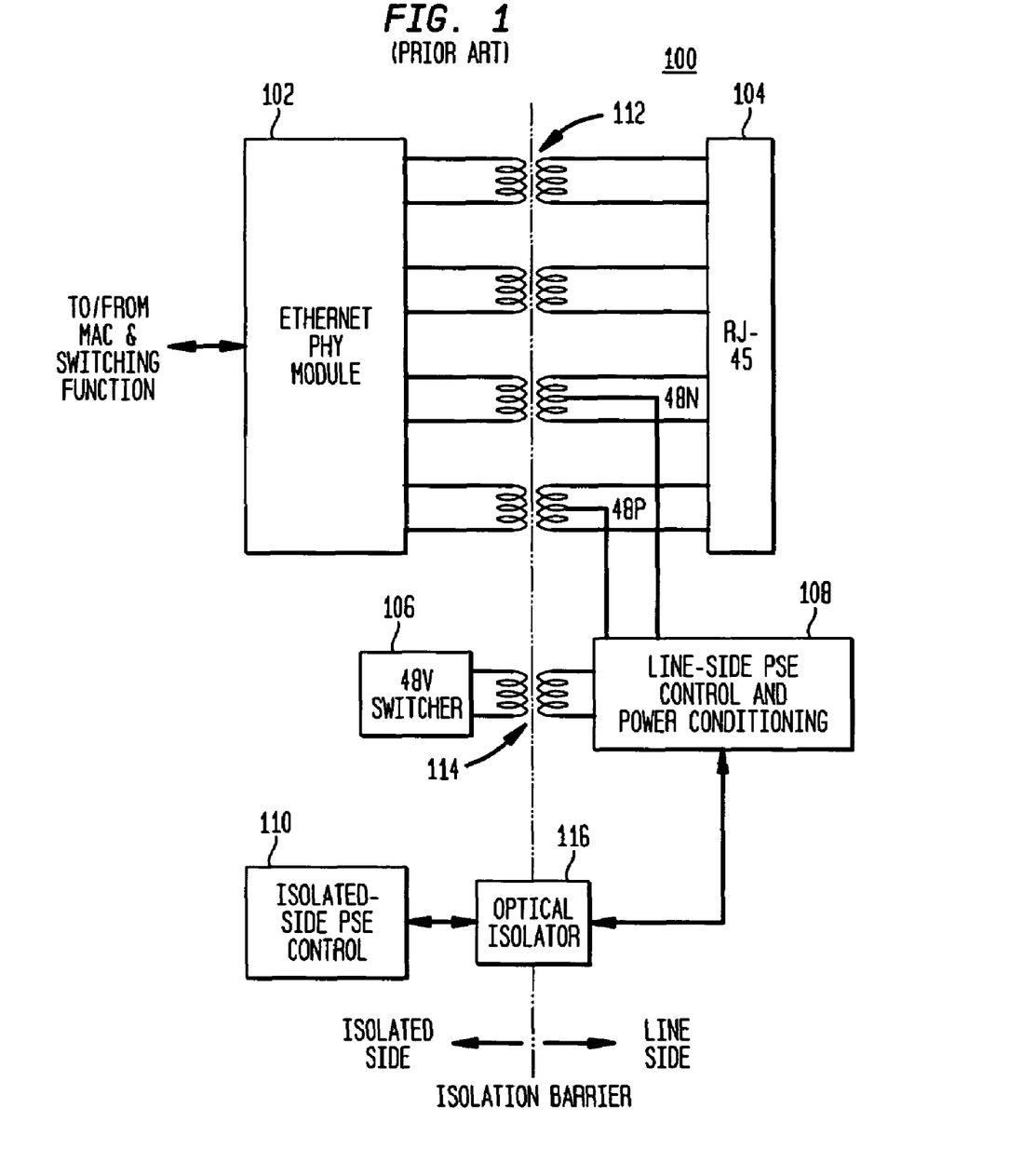
FIG. 1 shows a block diagram of a portion of a conventional Ethernet switch for a communication system that conforms to both the IEEE 802.3 Ethernet standard and the IEEE 802.3af PoE standard.

FIG. 1 shows a block diagram of a portion of a conventional Ethernet switch 100 for a communication system that conforms to both the IEEE 802.3 Ethernet standard and the IEEE 802.3af PoE standard, the teachings of both of which are incorporated herein by reference. As shown in FIG. 1, for each port in the switch, Ethernet switch 100 comprises Ethernet Physical-Layer (PHY) module 102, RJ-45 Ethernet connector 104, 48-volt switcher 106, line-side PSE control and power conditioning module 108, isolated-side PSE control module 110, four-pair signal-isolation transformer 112, power-isolation transformer 114, and optical isolator 116.

According to the IEEE 802.3 Ethernet standard, Ethernet PHY module 102 communicates with a Media Access Controller (MAC) and switching function and processes incoming and outgoing differential data signals that are transmitted over an Ethernet cable (not shown) that is connected to switch 100 at Ethernet connector 104. According to the IEEE 802.3af PoE standard, switch 100 is a PSE-capable switch that can provide a 48-volt DC (cable power) signal on the Ethernet cable to power a so-called powered device (PD), such as an Internet Protocol (IP) telephone, such that the PD device does not require any additional power source to operate. The 48-volt DC signal is provided by switcher 106 and modules 108 and 110.

Transformers 112 and 114 and optical isolator 116 provide high-voltage electrical isolation between (1) circuitry, such as Ethernet PHY module 102, switcher 106, and PSE control module 110, located on the so-called isolated side of switch 100 (i.e., the primary side of the transformers) and (2) circuitry, such as Ethernet connector 104 and PSE control and power conditioning module 108, located on the so-called line side of switch 100 (i.e., the transformers' secondary side), to protect the isolated-side circuitry from high voltages that might appear on the line side, such as those that can occur when lightening strikes near an Ethernet cable connected to connector 104.

Switcher 106 provides an AC power signal that is converted by power-isolation transformer 114 into a transformed AC power signal that can be converted by line-side PSE control and power conditioning module 108 into the 48-volt (differential) DC signal that is applied to the center taps of the secondary-side coils of two of the four transformer pairs in signal-isolation transformer 112.

In the embodiment shown in FIG. 1, signal-isolation transformer 112 has four pairs of transformer coils, where the 48-volt DC signal is applied to the center taps of two of the four secondary-side coils. The IEEE 802.3 Ethernet standard also covers lower-rate (e.g., 10 Mbit and 100 Mbit) Ethernet systems that have only two pairs of coils, where two of the four wire pairs in the Ethernet cable are spares. According to the IEEE 802.3af PoE standard, the 48-volt DC signal can be applied directed to the two spare wire pairs to power a PD device. Although this specification describes Ethernet switches with ports having four pairs of transformer coils, the teachings of this specification apply equally well to Ethernet switches with ports having only two pairs of transformer coils and two spare wire pairs.

According to one conventional implementation, line-side PSE control and power conditioning module 108 provides two PSE control functions (i.e., detection and classification) and three PSE power conditioning functions (i.e., rectification, filtering, and impedance control).

During detection, line-side PSE module 108 sequentially applies two different, low-power signals to the transformer coils (either low-current or low-voltage depending on the implementation, such as a first low-power signal of approximately 3 volts followed by a second low-power signal of approximately 8 volts, instead of the full 48-volt DC signal) to enable line-side PSE module 108 to detect whether a valid PD device (which is required by the PoE standard to have a 25-Kohm impedance across the lines that provide the detection signal) is currently connected to Ethernet connector 104 via an Ethernet cable.

If such a PD device is detected, then line-side PSE module 108 (optionally) performs classification, during which line-side PSE module 108 increases the level of the applied signal to approximately 18 volts and measures the PD signature current draw to determine the power classification of the detected PD device.

If a PD device is detected and (optionally) classified, then line-side PSE module 108 performs power conditioning, during which line-side PSE module 108 generates and applies the appropriate 48-volt DC signal via connector 104 to the Ethernet cable to power the PD device. This power conditioning function involves rectification and filtering of the transformed AC signal that is applied to line-side PSE module 108 from the secondary side of transformer 114 to generate the 48-volt DC signal. The power conditioning function also involves impedance control for the 48-volt DC signal. If no PD device is detected, then line-side PSE module 108 does not generate and apply a 48-volt DC signal to the Ethernet cable.

Depending on the particular implementation, switch 100 may be configured to support multiple Ethernet ports, like the port associated with Ethernet connector 104. According to one such conventional implementation, line-side PSE control and power conditioning module 108 is implemented as a relatively large integrated circuit (IC) that is capable of simultaneously supporting four different Ethernet ports. Examples of such line-side PSE control and power conditioning modules are:

The 12-channel PoE Manager, Product No. PD64012, sold by PowerDsine Ltd. of Israel;

The Quad Integrated Power Sourcing Equipment Power Manager, Product No. TPS2384, sold by Texas Instruments Incorporated of Dallas, Tex.; and The Quad IEEE 802.3af Power over Ethernet Controller with Integrated Detection module, Product No. LTC4258, sold by Linear Technology Corporation of Milpitas, Calif.

These conventional PSE control and power conditioning modules provide a certain (relatively limited) level of operating functionality. In certain conventional Ethernet switches, such as switch 100 of FIG. 1, additional (e.g., switch-vendor value-added) functions are provided by isolated-side PSE control module 110, which is typically implemented using a microcontroller. One exemplary additional function that may be provided by isolated-side PSE control module 110 is power balancing between multiple (e.g., as many as 48 or more) PD devices connected to a single Ethernet switch, where power balancing is based on the results of the PD power classification performed on each PD device. To implement this additional operating functionality, isolated-side PSE control module 110 receives (explicit) information about the status of the operations at line-side PSE module 108 via optical isolator 116 and transmits control signals to control the operations at line-side PSE module 108 via optical isolator 116.

Such a conventional configuration for switch 100 has a number of disadvantages. First of all, there is a considerable dollar cost to providing all of this circuitry associated with these functions. Furthermore, when two or more PD devices are connected to different Ethernet connectors supported by a single line-side PSE control and power conditioning module, there is no electrical isolation to protect the rest of the PD devices from a lightening strike near any one of the PD devices.

SUMMARY OF THE INVENTION

In one embodiment, the present invention is an apparatus having an isolated side and a line side. The apparatus comprises a physical-layer module, a power switcher, a power conditioning module, and a control module. The physical-layer module is (1) located on the isolated side of the apparatus, (2) adapted to be electrically coupled via a signal-isolation transformer to a cable connector located on the line side of the apparatus, and (3) adapted to process signals transmitted over the cable. The power switcher is located on the isolated side of the apparatus. The power conditioning module is (1) located on the line side of the apparatus, (2) electrically coupled to the power switcher via a power-isolation transformer adapted to convert an AC power signal received from the power switcher into a transformed AC power signal, and (3) adapted to convert the transformed AC power signal into a cable power signal to be supplied via the connector to the cable in order to power a cable-powered device connected to the cable. The control module is located on the isolated side of the apparatus and adapted to perform a detection function in which the control module determines whether or not a cable-powered device is connected to the cable.

In another embodiment, the present invention is a method for powering a cable-powered device using an apparatus having a line side and an isolated side, wherein the cable-powered device is connected to the line-side of the apparatus via a cable. According to the method, signals transmitted from the cable-powered device over the cable are received at the line side of the apparatus. The signals from the cable-powered device are (1) transmitted from the line side of the apparatus to the isolated side of the apparatus via a signal-isolation transformer located between the line side of the apparatus and the isolated side of the apparatus and (2) processed on the isolated side of the apparatus. An AC power signal on the isolated side of the apparatus is converted into a transformed AC power signal on the line side of the apparatus via a power-isolation transformer located between the line side of the apparatus and the isolated side of the apparatus. The transformed AC power signal is converted, on the line side of the apparatus, into a cable power signal, which is supplied to the cable in order to power the cable-powered device. A determination is made, on the isolated side of the apparatus, that the cable-powered device is connected to the cable based on signals received at the isolated side of the apparatus from the line side of the apparatus via the power-isolation transformer.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Figure 2:
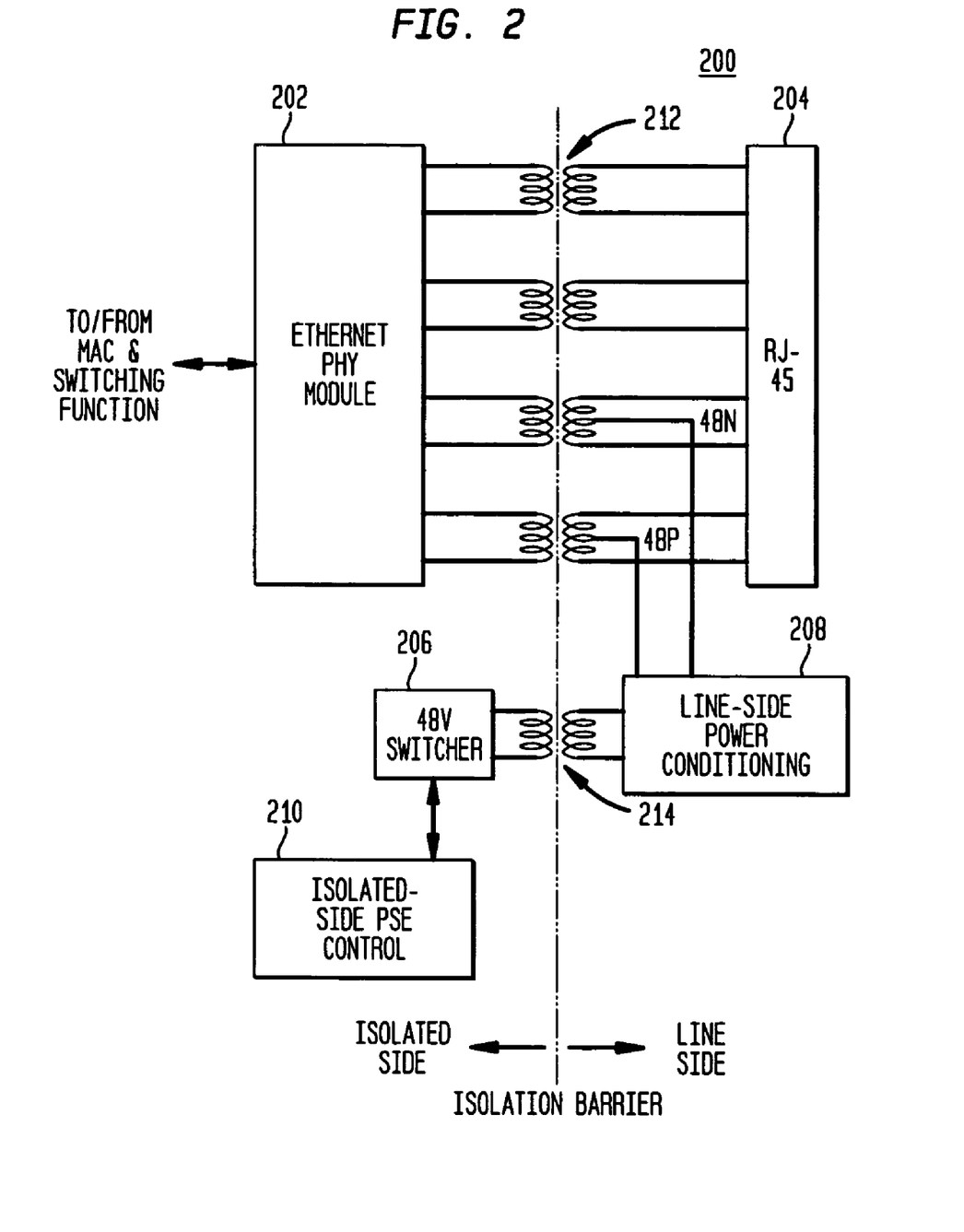
FIG. 2 shows a block diagram of a portion of an Ethernet switch for a communication system that conforms to the IEEE 802.3 Ethernet and 802.3af PoE standards, according to one embodiment of the present invention.

FIG. 2 shows a block diagram of a portion of an Ethernet switch 200 for a communication system that conforms to the IEEE 802.3 Ethernet and the IEEE 802.3af Power over Ethernet (PoE) standards, according to one embodiment of the present invention. As shown in FIG. 2, Ethernet switch 200 comprises Ethernet PHY module 202, RJ-45 Ethernet connector 204, 48-volt switcher 206, line-side PSE power conditioning module 208, isolated-side PSE control module 210, four-pair signal-isolation transformer 212, and power-isolation transformer 214, where switcher 206 and power conditioning module 208 function together as an isolated switching power supply. Ethernet PHY module 202, connector 204, and transformers 212 and 214 are similar to the corresponding elements in conventional switch 100 of FIG. 1. Note that, unlike switch 100 of FIG. 1, switch 200 does not have any optical isolator.

According to this embodiment of the present invention, the PSE detection and (optional) classification functions that were performed by line-side PSE control and power conditioning module 108 of FIG. 1 and all of the PSE control functions that were performed by isolated-side PSE control module 110 of FIG. 1 are now performed by isolated-side PSE control module 210 of FIG. 2. The only PSE functions that remain on the line side of switch 200 of FIG. 2 are the power conditioning functions implemented by PSE power conditioning module 208 of FIG. 2. These power conditioning functions include, but are not limited to, rectification, filtering, and impedance control. Note that, in this embodiment, isolated-side PSE control module 210 does not receive any explicit information from the line side of switch 200 about the status of the operations at line-side PSE power conditioning module 208.

The migration of the PSE detection and classification functions from the line side of switch 100 to the isolated side of switch 200 is enabled by the fact that all of the information needed to implement those functions appears on both sides (i.e., on both the primary- and secondary-side coils) of power-isolation transformer 214. Note that Ethernet PHY module 202, switcher 206, and PSE control module 210 are preferably, but do not have to be, implemented in a combined manner on a single integrated circuit.

This function migration from line side to isolated side also enables practical implementation of a separate line-side PSE power conditioning module, similar to module 208 of FIG. 2, for each Ethernet connector, similar to connector 204, supported by switch 200. As such, a switch of the present invention can be configured with multiple Ethernet ports, while providing electrical isolation between all of the Ethernet ports. In particular, the high voltage associated with a lightening strike near an Ethernet cable connected to one of the Ethernet ports will not reach any of the other Ethernet ports (or their associated cables and PD devices). In one possible implementation, a single module, like isolated-side PSE control module 210 of FIG. 2, can be designed to support multiple Ethernet ports, with each port having its own switcher (like switcher 206), transformer (like transformer 214), PSE power conditioning module (like module 208) and Ethernet connector (like connector 204), while still allowing very high levels of integration.

Figure 3:
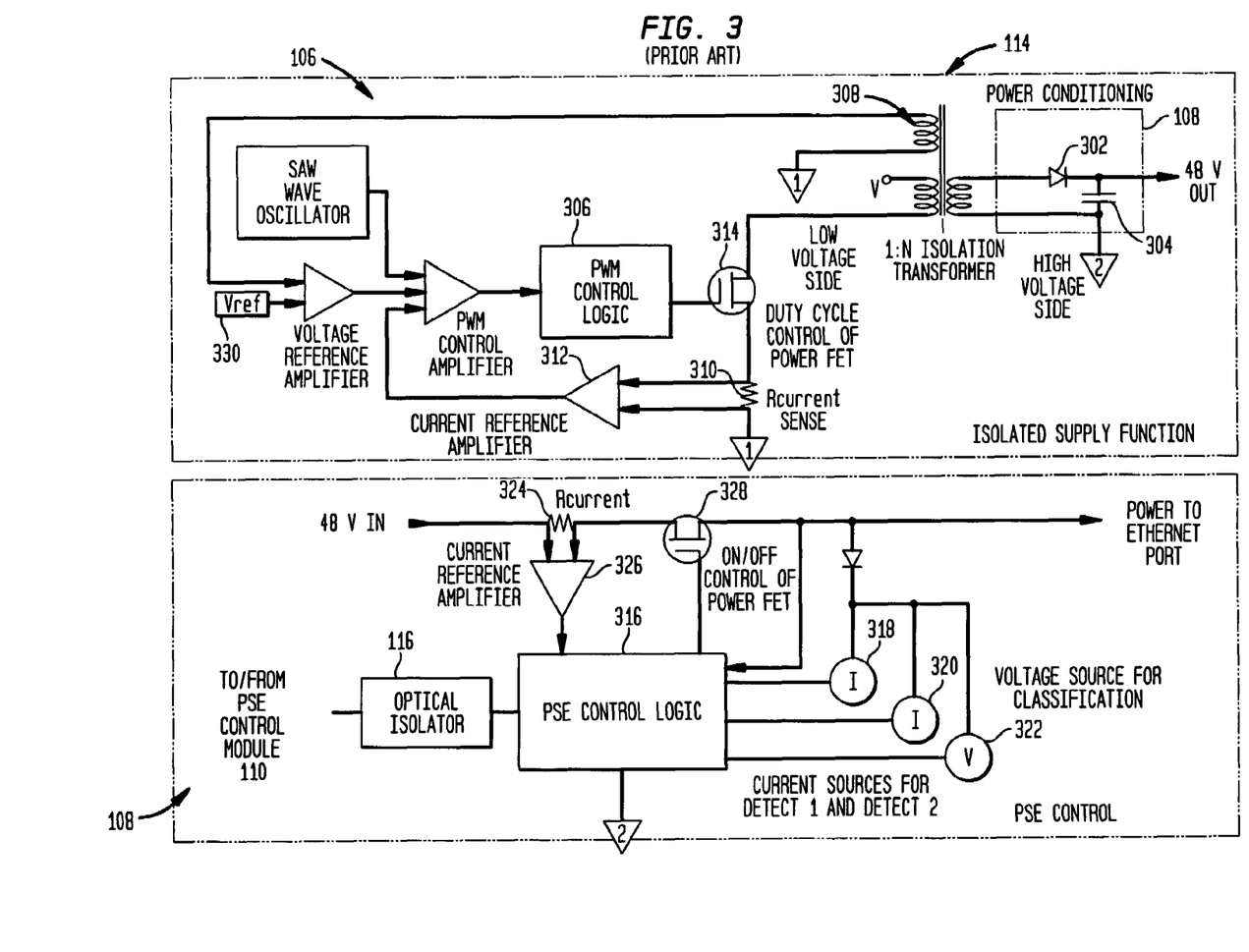
FIG. 3 shows a schematic block diagram of the switcher, the line-side PSE control and power conditioning module, the power-isolation transformer, and the optical isolator of the conventional Ethernet switch of FIG. 1.

FIG. 3 shows a schematic block diagram of switcher 106, line-side PSE control and power conditioning module 108, power-isolation transformer 114, and optical isolator 116 of conventional switch 100 of FIG. 1. In FIG. 3, the elements in the upper half of the diagram that are to the left of transformer 114 correspond to switcher 106. Diode 302 and capacitor 304 symbolically represent the line-side circuitry that provides the power conditioning functions of line-side PSE module 108, while the elements in the lower half of the diagram represent the line-side circuitry that provides the detection and classification functions of line-side PSE module 108.

As represented in the upper half of FIG. 3, switcher 106 is a stand-alone, isolated, 48-volt, flyback switching supply that provides power to the PSE circuitry. Pulse Width Modulation (PWM) control logic 306 is provided information regarding output voltage (via transformer winding 308) and drive current (via current-sensing resistor 310 and current reference amplifier 312) and uses this information to adjust the pulse width of the drive signal applied to the gate of power FET 314, such that the desired voltage, with an appropriate current limit, is applied to the output.

As represented in the lower half of FIG. 3, optionally under the control of isolated-side PSE control module 110, PSE control logic 316 of line-side PSE module 108 performs the PoE detection and classification functions by sequentially providing two different fixed currents 318 and 320 onto the output, while the output voltage is measured by PSE control logic 316. This is followed by the application of a fixed voltage 322 during which the current is measured by resistor 324 and amplifier 326. During a normal power-up sequence, this is followed by PSE control logic 316 turning on power FET 328 and continuing to monitor current draw and voltage for health/fault/disconnect status.

Figure 4:
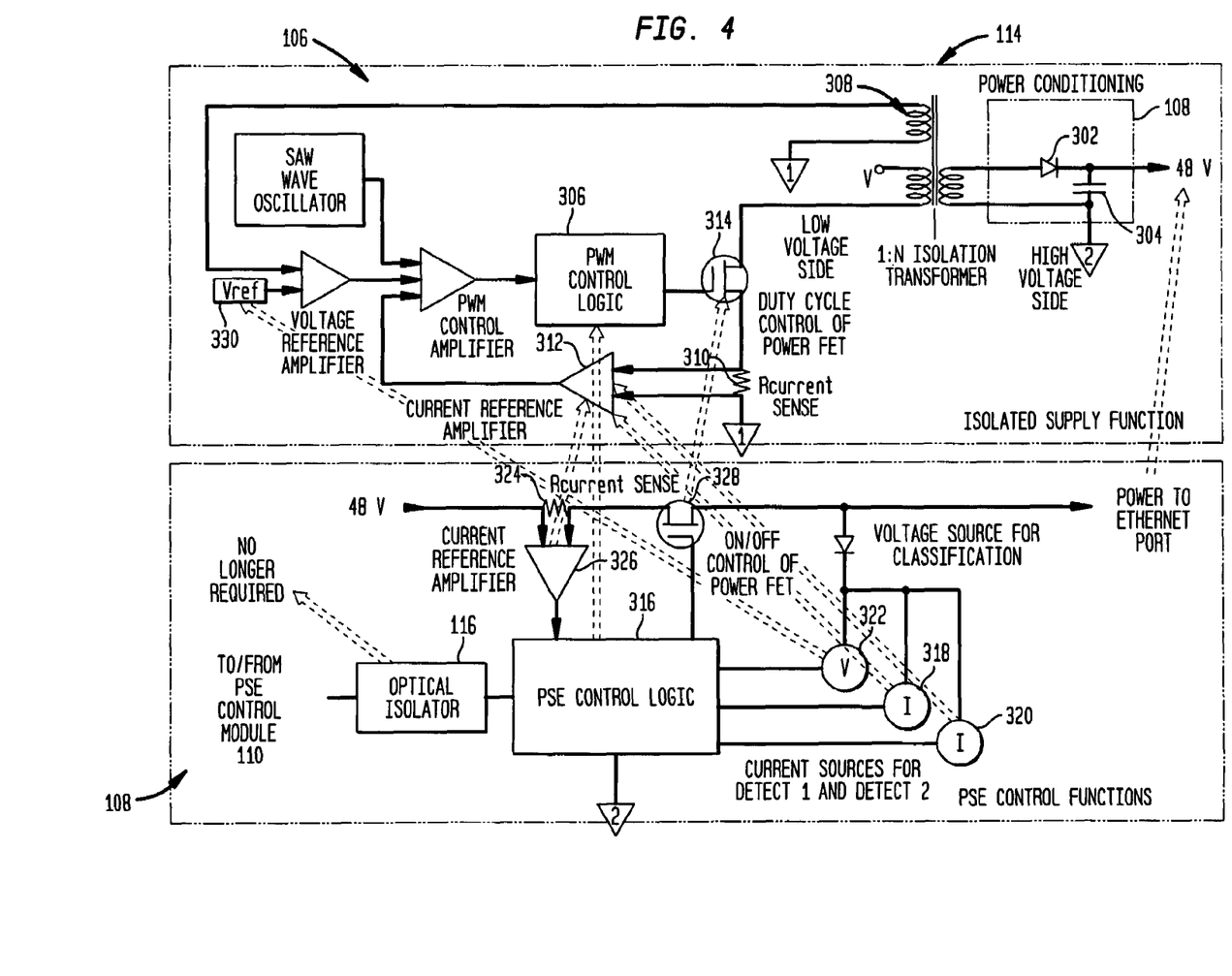
FIG. 4 shows the schematic block diagram of FIG. 3 annotated to indicate the migration of functions associated with particular elements in the line-side circuitry of the PSE control and power conditioning module of FIG. 1 to a combined switcher/PSE control module corresponding to a combined implementation of the switcher and the isolated-side PSE control module of FIG. 2.

FIG. 4 shows the schematic block diagram of FIG. 3 annotated to indicate the migration of functions associated with particular elements in the line-side circuitry of PSE control and power conditioning module 108 of FIG. 1 to a combined switcher/PSE control module corresponding to a combined implementation of switcher 206 and PSE control module 210 of FIG. 2, located on the isolated side of switch 200. As represented in FIG. 4, all of the line-side functions on the lower half of the diagram either migrate to the isolated side or are eliminated (i.e., in the case of the optical isolator).

In particular, as represented in FIG. 4:

The functions of power FET 328 are migrated to power FET 314;

The functions of current sources 318 and 320, resistor 324, and amplifier 326 are migrated to resistor 310, amplifier 312, and PWM control logic 306;

The functions of PSE control logic 316 are migrated to PWM control logic 306;

The functions of voltage source 322 are migrated to voltage reference 330; and The detection and classification power provided to the Ethernet connector is migrated to the output of the line-side power conditioning function.

Figure 5:
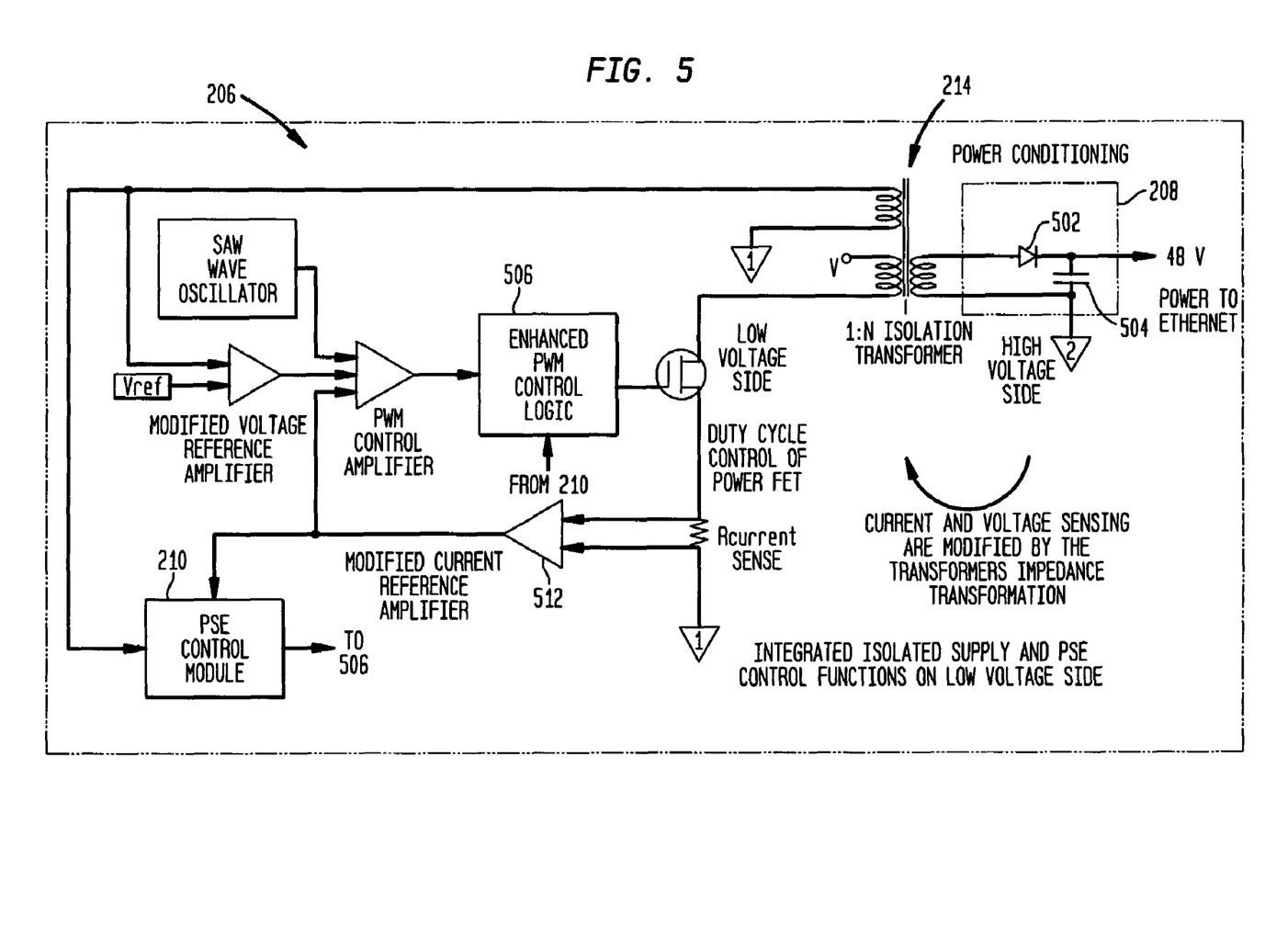
FIG. 5 shows a schematic block diagram of the switcher, the line-side PSE power conditioning module, the isolated-side PSE control module, and the power-isolation transformer of the Ethernet switch of FIG. 2, according to one possible embodiment of the present invention.

FIG. 5 shows a schematic block diagram of switcher 206, line-side PSE power conditioning module 208, isolated-side PSE control module 210, and power-isolation transformer 214 of switch 200 of FIG. 2, according to one possible embodiment of the present invention. In FIG. 5, the elements to the left of transformer 214 correspond to switcher 206 and PSE control module 210, while diode 502 and capacitor 504 symbolically represent the line-side circuitry that provides the power conditioning functions of PSE power conditioning module 208. In this particular implementation, the PSE control module 210 is shown being implemented as a set of logic separate from enhanced PWM control logic 506 of switcher 206. In a combined implementation, a single logic device can be used to implement all functions to the left of power-isolation transformer 214 in FIG. 5.

Alternatively, the functions of PSE control module 210 may be implemented in software and/or hardware in two or more different processing modules, including one or more processing modules that support multiple ports. For example, in one possible implementation, a single logic device implements all of the functions to the left of power-isolation transformer 214 that are associated with a single port, while another (shared) logic device, such as a microcontroller, implements additional functions that are associated with multiple ports, such as power balancing.

In any case, PSE control module 210 monitors the current and voltage from transformer 214 and current sense amplifier 512 and determines the appropriate PSE state for commanding enhanced PWM control logic 506, which is enhanced (relative to PWM control logic 306 of FIG. 3) to support the detection and classification functions that migrated to the isolated side.

Figure 6:
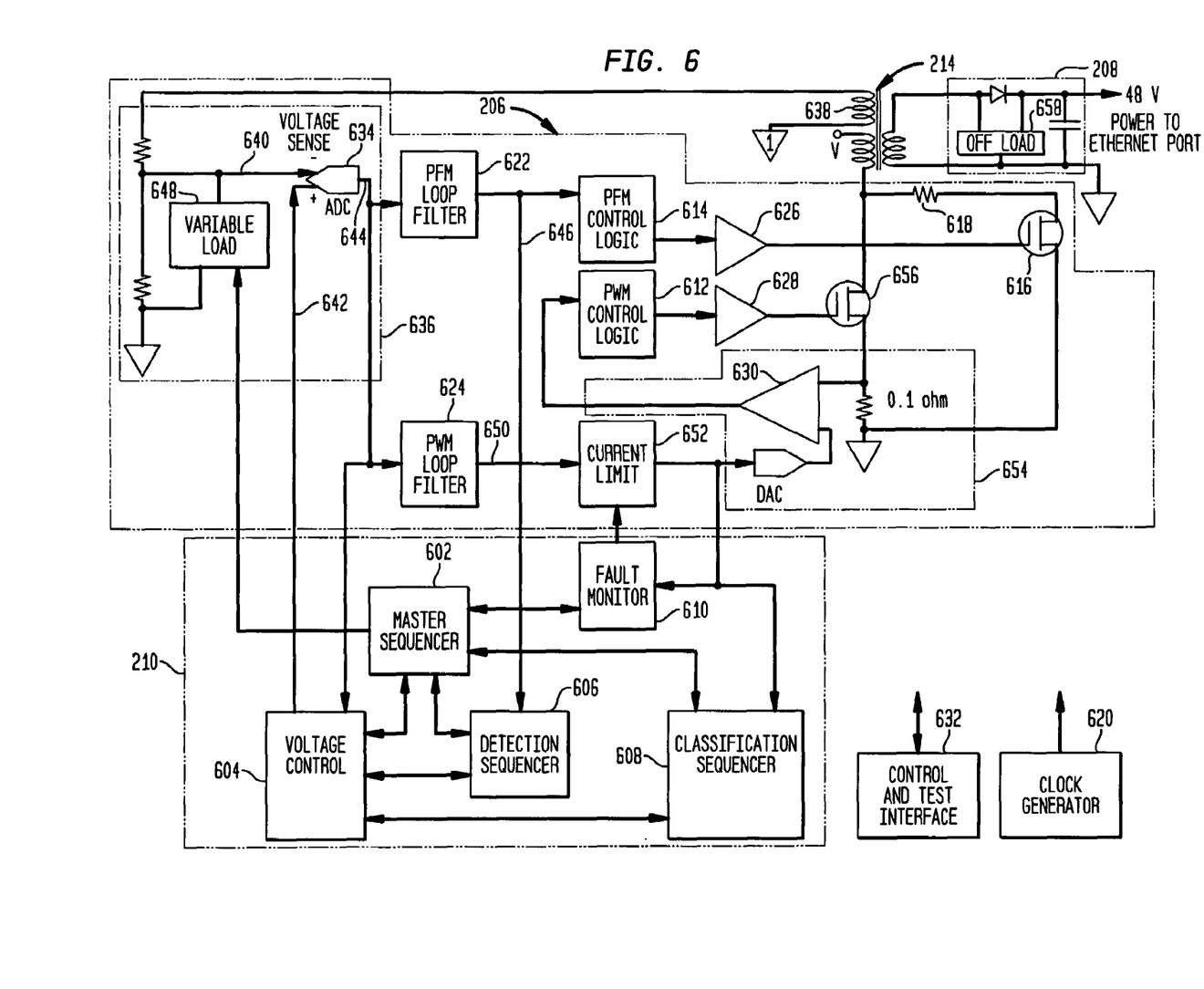
FIG. 6 shows a schematic block diagram of the switcher, the line-side PSE power conditioning module, the isolated-side PSE control module, and the power-isolation transformer of the Ethernet switch of FIG. 2, according to one possible low-voltage, mixed-signal, CMOS-technology embodiment of the present invention.

FIG. 6 shows a schematic block diagram of switcher 206, line-side PSE power conditioning module 208, isolated-side PSE control module 210, and power-isolation transformer 214 of switch 200 of FIG. 2, according to one possible low-voltage, mixed-signal, CMOS-technology embodiment of the present invention. The PSE circuitry of FIG. 6 supports all three modes of operation described previously: detection, classification, and power conditioning (i.e., power on).

In this embodiment, PSE control module 210 is implemented in digital logic as logic modules 602-610. Similarly, enhanced PWM control logic 506 of FIG. 5 is implemented in digital logic as PWM control logic module 612 and Pulse Frequency Modulation (PFM) control logic module 614, where PWM control logic module 612 controls pulse width modulation during the classification and power-on modes, and PFM control logic module 614 controls a PFM loop comprising detection (MOSFET) transistor 616 and current-limiting resistor 618 used during the detection mode.

When power is first applied to the PSE circuitry of FIG. 6, analog bias circuitry is stabilized, clocks (e.g., from clock generator 620) are started, and all circuitry is reset or initialized. Following initialization, operation of the PSE circuitry is under the control of master sequencer 602, which will determine the mode of operation for the PSE circuitry. Per the IEEE 802.3af PoE Standard, the basic sequence of operation is: (1) detection, (2) classification, and (3) power conditioning. Provisions may be made for various fault conditions and/or user interventions to override this basic sequencing.

Not explicitly shown in FIG. 6 (or in subsequent FIGS. 7-9) are paths whereby digital logic functions are clocked at appropriate times taking into account proper settling of the sensed levels. Also not explicitly shown are (a) control signals, whereby sequencers (e.g., master sequencer 602, detection sequencer 606, and classification sequencer 608) can adjust (i) loop filter parameters (e.g., of PFM loop filter 622 and PWM loop filter 624), (ii) gains (e.g., of amplifiers 626, 628, and 630), or (iii) other parametric settings and (b) the control and test interface paths (e.g., from interface 632) that allow a user or surrogate processor to adjust voltages and current thresholds and to fine-tune timing, as appropriate.

Operation of the PSE circuitry of FIG. 6 for the three different modes of operation (i.e., detection, classification, and power conditioning) is described below in the context of FIGS. 7-9, respectively.

Figure 7:
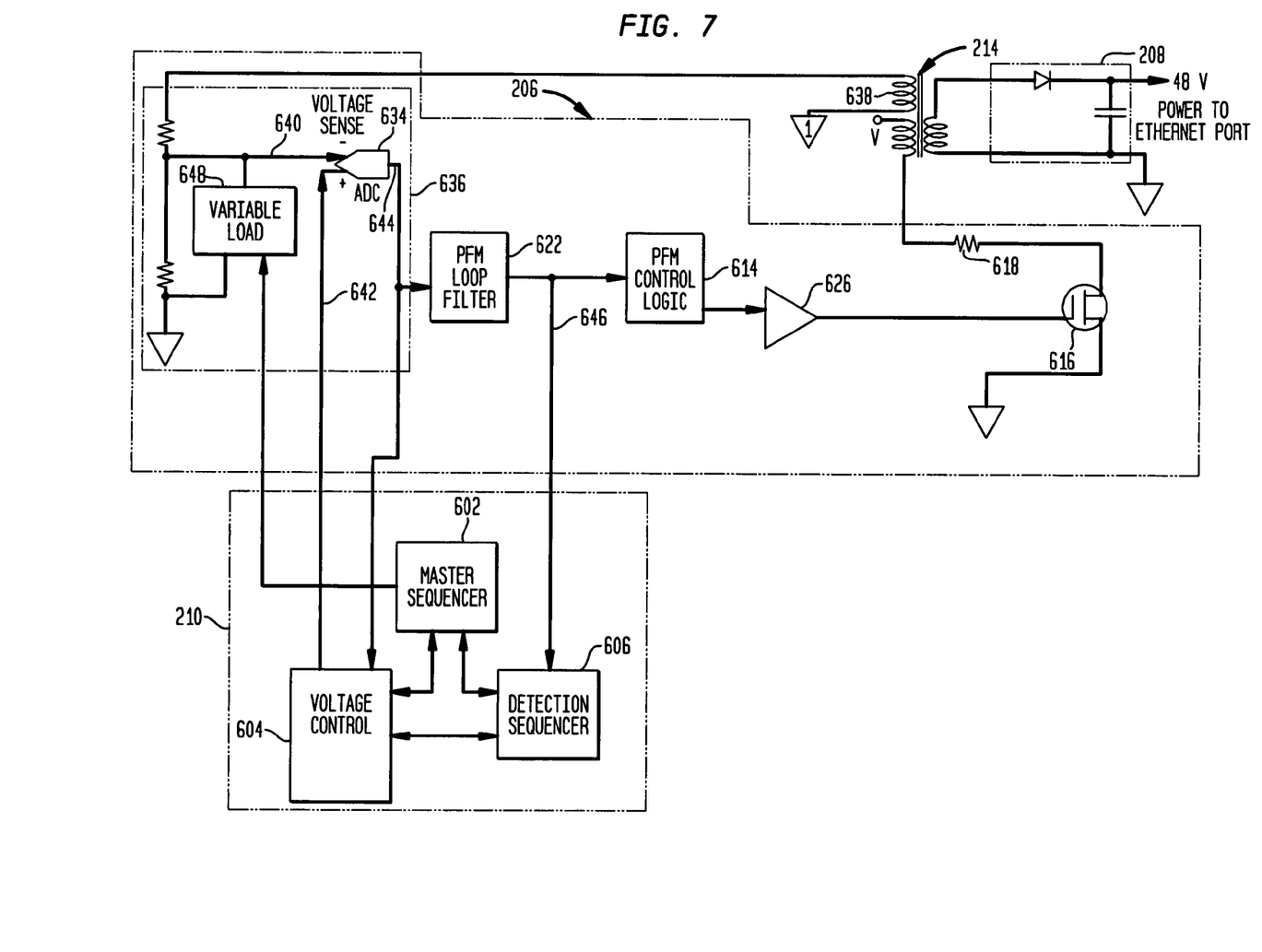
FIG. 7 shows a schematic block diagram of only those elements of FIG. 6 that are involved in the PSE detection mode of operation.

FIG. 7 shows a schematic block diagram of only those elements of FIG. 6 that are involved in the PSE detection mode of operation. Following initialization, master sequencer 602 will set variable load 648 to mimic the expected detection load and then direct detection sequencer 606 to begin the detection process, which continues under the control of detection sequencer 606.

Detection sequencer 606 directs voltage-control logic 604 to select and apply the first detection voltage point V1 (e.g., nominally about 3 volts) as reference voltage 642 to be used by voltage-sense ADC (analog-to-digital converter) 634 of voltage-sense block 636.

Detection sequencer 606 then enables PFM control logic 614, which sends short-duration pulses (e.g., typically about 100 to 500 ns long) to detection transistor 616, which in turn sends precision low-current pulses to the isolated side of power transformer 214, such that the resulting output voltage on the line side of power transformer 214 ramps up slowly. This transformer output voltage is sensed through third winding 638 in power transformer 214 by voltage-sense block 636, in which ADC 634 compares sensed voltage 640 with reference voltage 642.

The resulting digitized signal 644 from ADC 634 is appropriately filtered by PFM loop filter 622 in order to maintain loop stability, and the resulting filtered signal 646 is used by PFM control logic 614 to determine an appropriate pulse sequence that stabilizes the transformer output voltage at set point V1.

Detection sequencer 606 monitors the duration taken to arrive at set point V1. If the duration is too long, then detection sequencer 606 will time out, resetting the sequence. Such a time-out is indicative of an improper detection load on the output, such as the excessive capacitance required to be detected by the IEEE 802.3af PoE Standard. If the initial voltage set point V1 is reached successfully (e.g., within a specified duration), then detection sequencer 606 will record the frequency (f1) that PFM control logic 614 employed to stabilize at that level.

Detection sequencer 606 will then direct voltage-control logic 604 to select the second detection voltage point V2 (e.g., nominally about 8 volts), and an analogous ramp-up sequence will be implemented until either set point V2 is reached or a time-out occurs. If the second voltage set point V2 is reached successfully, then detection sequencer 606 will record the frequency (f2) that PFM control logic 614 employed to stabilize at that level.

If the detection process gets this far without timing out, then detection sequencer 606 estimates the detection load from the difference between frequencies f1 and f2. This is possible because the frequency, pulse width, peak current, and peak voltage at both set points V1 and V2 are known and can be used to calculate the average current and the average voltage. After compensating for parasitic losses, the value of the detection resistor in the PoE powered device can be calculated from the slope of the average voltage-current curve between set points V1 and V2.

If the detection mode was not successful (e.g., detection sequencer timed out while trying to achieve either set point V1 or set point V2), then master sequencer 602 will wait a specified period (e.g., one half second) before re-initiating the detection sequence, as required by the IEEE 802.3af PoE Standard.

Figure 8:
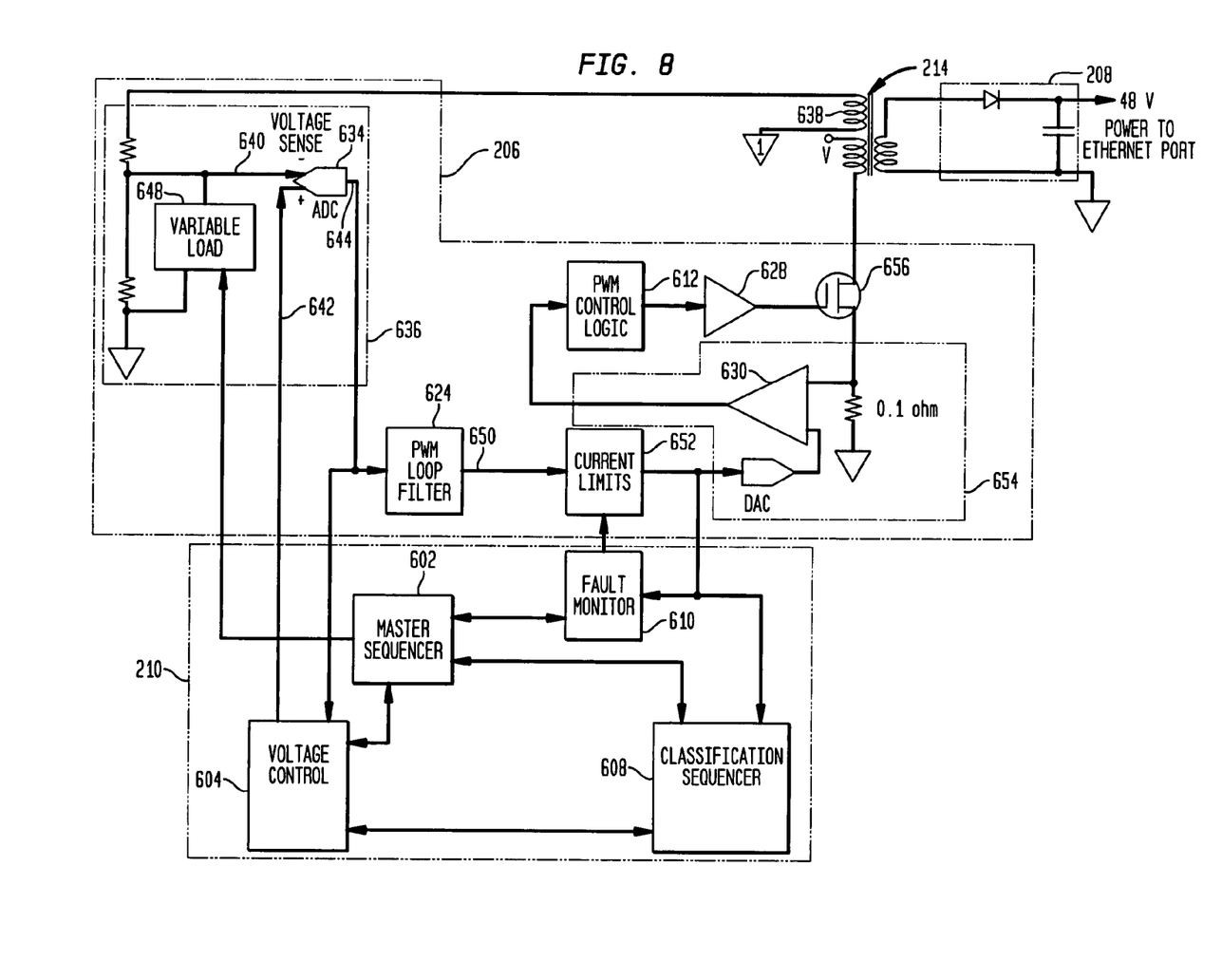
FIG. 8 shows a schematic block diagram of only those elements of FIG. 6 that are involved in the PSE classification mode of operation.

FIG. 8 shows a schematic block diagram of only those elements of FIG. 6 that are involved in the PSE classification mode of operation. If the detection process was successful, then master sequencer 602 will initiate a classification process under the control of classification sequencer 608.

Classification sequencer 608 directs voltage-control logic 604 to select the classification voltage (e.g., nominally about 18 volts). During classification, switcher 206 operates as a conventional current-mode, pulse-width modulated, switching power supply. Reference voltage 642 from voltage-control logic 604 is compared by ADC 634 to sensed voltage 640, which depends on the output voltage of power transformer 214 as reflected to third winding 638.

To ensure that the voltage from third winding 638 is closely representative of the actual transformer output voltage (in order to maintain high accuracy), an adjustable matching load 648 is utilized and set by master sequencer 602 to mimic the actual load expected in the classification mode. (Master sequencer 602 analogously controls variable load 648 during the detection and power-on modes.)

ADC 634 digitizes the error between the desired output voltage and the actual output voltage. This digitized error 644 is conditioned through PWM loop filter 624 to maintain loop stability. The resulting filtered error signal 650 is processed through digital current-limit function 652 and applied to current-sense block 654, which senses the transformer current, to enable PWM control logic 612 to determine the peak current at which the pulse width modulator should turn off the power (MOSFET) transistor 656.

In the PSE classification mode, the programmable current-limit function 652 is set and monitored by fault monitor 610 to limit the average output current, e.g., to under 100 ma, as required by the IEEE 802.3af PoE Standard.

Classification sequencer 608 controls all aspects of voltage application, timing, and time-out processing for the PSE classification mode defined in the IEEE 802.3af PoE Standard. If the classification process completes successfully, then the current observed (i.e., the output of current-limit function 652) is reported to classification sequencer 608, which determines the power class of the PoE powered device per the IEEE 802.3af PoE Standard.

Figure 9:
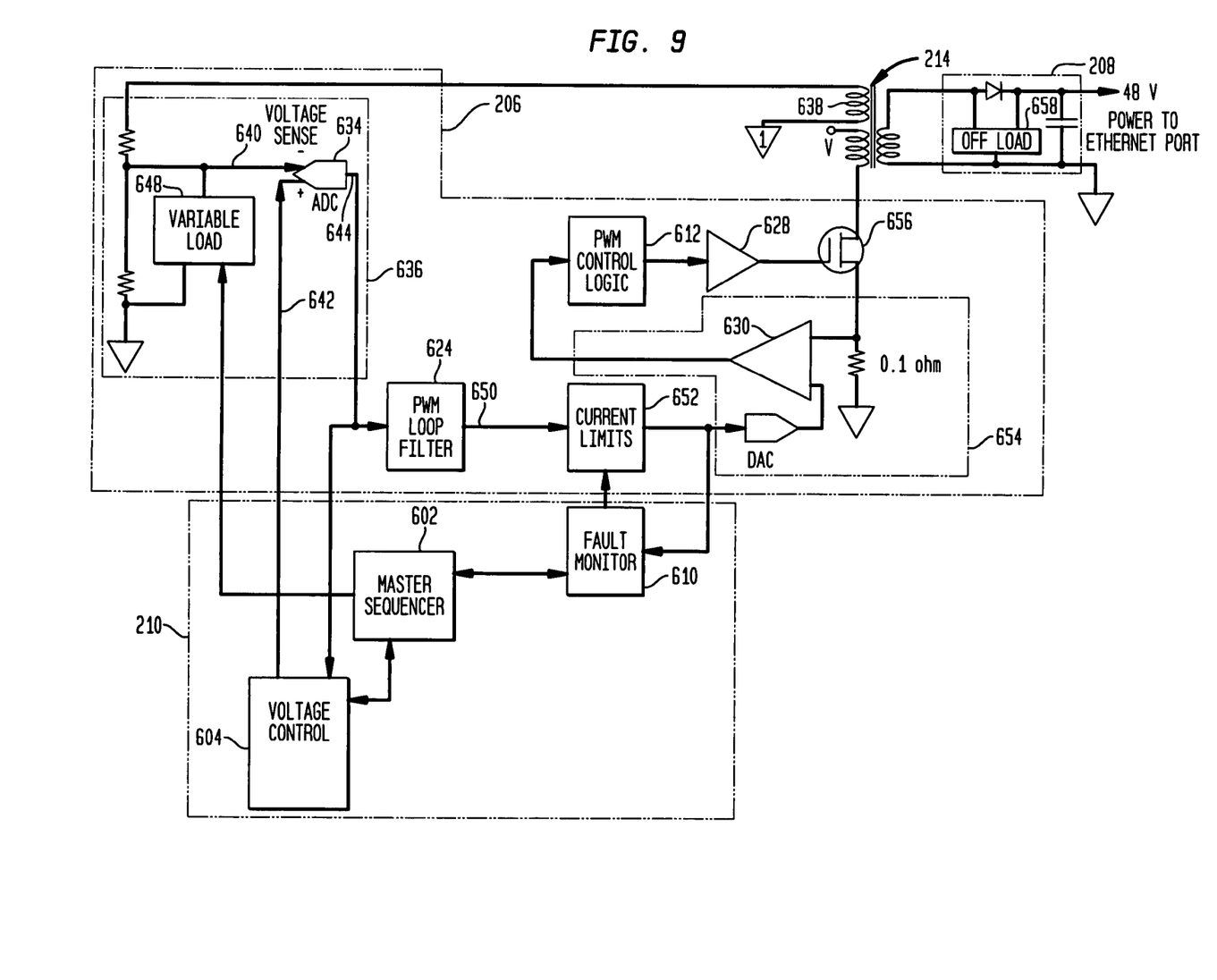
FIG. 9 shows a schematic block diagram of only those elements of FIG. 6 that are involved in the PSE power-on mode of operation.

FIG. 9 shows a schematic block diagram of only those elements of FIG. 6 that are involved in the PSE power-on mode of operation. Following the classification process, master sequencer 602 will initiate the power-on mode.

Master sequencer 602 will set variable load 648 to mimic the expected load and then direct voltage-control logic 604 to select the power-on voltage level (e.g., nominally about 48 volts). During power-on, switcher 206 operates as a conventional current-mode, pulse-width modulated, switching power supply. Reference voltage 642 from voltage-control logic 604 is compared by ADC 634 to sensed voltage 640, which depends on the output voltage of power transformer 214 as reflected to third winding 638.

ADC 634 digitizes the error between the desired output and the actual output voltage. This digitized error 644 is conditioned through PWM loop filter 624 to maintain loop stability. The resulting filtered error signal 650 is processed through current-limit function 652 and applied to current-sense block 654, which senses the transformer current, to enable PWM control logic 612 to determine the peak current at which the pulse width modulator should turn off the power (MOSFET) transistor 656.

In the PSE power-on mode, the programmable current-limit function 652 is set and monitored by fault monitor 610 to limit the average output current, e.g., to nominally about 425 ma during initial power application (in-rush conditions) and then to a current limit dependent upon the results of the classification process, not to exceed nominally about 375 ma, as required by the IEEE 802.3af PoE Standard.

Master sequencer 602 controls all aspects of voltage application, timing, and time-out processing for the PSE power-on mode defined in the IEEE 802.3af PoE Standard. Various current limits, such as Icut, Ilimit, and Iinrush, are programmed and monitored by fault monitor 610 using information received from current-limit function 652. Appropriate levels of ramp-up rates, ramp-down rates, noise, and ripple currents are ensured by a combination of loop characteristics and hardware components utilized in the output circuits (e.g., power conditioning module 208).

Off-load block 658 in power conditioning module 208 senses when switcher 206 is shutting down in order to apply a small additional load to the output to ensure that the transformer output decays within the duration allotted by the IEEE 802.3af PoE Standard.

Depending on the particular implementation, the isolated-side PSE control module of the present invention can provide other PSE control functions that are normally implemented on the line side of certain conventional Ethernet switches. In general, these functions may be those required by the IEEE 802.3af standard, and, in particular, by the requirements of FIG. 33-6 (entitled "PSE State Diagram") and FIG. 33-7 (entitled "PSE Monitor Overload, Monitor Short, and Monitor MPS State Diagram") of the IEEE 802.3af standard.

Although the present invention has been described in the context of communication systems conforming to the IEEE 802.3 Ethernet and IEEE 802.3af PoE standards, the invention is not necessarily limited to communication systems that conform to either or both of those two standards. Moreover, as those standards may evolve over time, it is expected that implementations of the present invention can also evolve in a corresponding manner.

Although the present invention is described in the context of switches in which a 48-volt (differential) DC signal is applied to the secondary-side coils of two signal-isolation transformers, the invention is not necessarily so limited. For example, the present invention may be implemented in the context of (1) DC power signals having voltage levels other than 48 volts, (2) non-differential (i.e., single-sided) DC power signals, and (3) even differential or single-sided AC power signals. Moreover, the power signals may be provided to the cables via other means, such as direct connection to the connector. Furthermore, the present invention may be implemented in contexts other than switches, such as routers or other suitable apparatus.

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing steps in a software program. Such software may be employed in, for example, a digital signal processor, microcontroller, or general-purpose computer.

It will be further understood that various changes in the details, materials, and arrangements of the parts which have been described and illustrated in order to explain the nature of this invention may be made by those skilled in the art without departing from the scope of the invention as expressed in the following claims.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

We claim:

1. Apparatus having an isolated side and a line side, the apparatus comprising:
   a physical-layer module (1) located on the isolated side of the apparatus, (2) capable of being electrically coupled via a signal-isolation transformer to a cable connector located on the line side of the apparatus, and (3) capable of processing signals transmitted over the cable;
   a power switcher located on the isolated side of the apparatus;
   a power conditioning module (1) located on the line side of the apparatus, (2) electrically coupled to the power switcher via a power-isolation transformer adapted to convert an AC power signal received from the power switcher into a transformed AC power signal, and (3) capable of converting the transformed AC power signal into a cable power signal to be supplied via the connector to the cable in order to power a cable-powered device connected to the cable; and
   a control module located on the isolated side of the apparatus and capable of performing a detection function in which the control module determines whether or not a cable-powered device is connected to the cable.

2. The invention of claim 1, wherein the apparatus conforms to the IEEE 802.3 Ethernet and 802.3af Power over Ethernet standards.

3. The invention of claim 1, wherein the cable power signal is a 48-volt differential DC power signal.

4. The invention of claim 1, wherein the power conditioning module is capable of converting the transformed AC power signal into a DC power signal to be supplied via the connector to the cable in order to power the cable-powered device connected to the cable.

5. The invention of claim 1, wherein:
the signal-isolation transformer comprises a plurality of transformer pairs; and
the power conditioning module is capable of applying the cable power signal as a differential signal to center taps of line-side coils of two of the transformer pairs.

6. The invention of claim 1, wherein the power conditioning module is capable of applying the cable power signal as a differential signal to two spare wire pairs in the cable.

7. The invention of claim 1, wherein the control module is further capable of performing a classification function in which the control module determines a power classification for a detected cable-powered device.

8. The invention of claim 1, wherein the power conditioning module provides rectification, filtering, and impedance control functions to convert the transformed AC power signal into a DC power signal.

9. The invention of claim 1, wherein no control functions associated with the generation of the cable power signal are implemented on the line side of the apparatus.

10. The invention of claim 1, wherein the physical-layer module, the power switcher, and the control module are implemented on a single integrated circuit.

11. The invention of claim 1, wherein the power conditioning module is capable of providing only one cable power signal via only one connector to only one cable at a time.

12. The invention of claim 11, wherein the control module is capable of providing the detection function for more than one connector at a time.

13. The invention of claim 12, wherein:
the apparatus comprises a plurality of ports, each port having its own connector, its own associated power conditioning module, its own power-isolation transformer, and its own power switcher; and
the control module is capable of providing the detection function for at least two of the ports.

14. The invention of claim 1, wherein the control module is capable of implementing the detection function based on information present on an isolated-side coil of the power-isolation transformer.

15. The invention of claim 1, wherein the control module is capable of implementing the detection function without receiving any explicit information from the line-side of the apparatus.

16. The invention of claim 1, wherein:
the apparatus conforms to the IEEE 802.3 Ethernet and 802.3af Power over Ethernet standards;
the cable power signal is a 48-volt differential DC power signal;
the power conditioning module is capable of converting the transformed AC power signal into the DC power signal to be supplied via the connector to the cable in order to power the cable-powered device connected to the cable;
the control module is further capable of performing a classification function in which the control module determines a power classification for a detected cable-powered device;
the power conditioning module provides rectification, filtering, and impedance control functions to convert the transformed AC power signal into the DC power signal;
no control functions associated with the generation of the cable power signal are implemented on the line side of the apparatus;
the power conditioning module is capable of providing only one cable power signal via only one connector to only one cable at a time;
the control module is capable of providing the detection function for more than one connector at a time;
the apparatus comprises a plurality of ports, each port having its own connector, its own associated power conditioning module, its own power-isolation transformer, and its own power switcher;
the control module is capable of providing the detection function for at least two of the ports;
the control module is capable of implementing the detection function based on information present on an isolated-side coil of the power-isolation transformer; and
the control module is capable of implementing the detection function without receiving any explicit information from the line-side of the apparatus.

17. The invention of claim 16, wherein:
the signal-isolation transformer comprises a plurality of transformer pairs; and
the power conditioning module is capable of applying the cable power signal as a differential signal to center taps of line-side coils of two of the transformer pairs.

18. The invention of claim 16, wherein the power conditioning module is capable of applying the cable power signal as a differential signal to two spare wire pairs in the cable.

19. The invention of claim 16, wherein the physical-layer module, the power switcher, and the control module are implemented on a single integrated circuit.

20. A method for powering a cable-powered device using an apparatus having a line side and an isolated side, wherein the cable-powered device is connected to the line-side of the apparatus via a cable, the method comprising:
receiving, at the line side of the apparatus, signals transmitted from the cable-powered device over the cable;
transmitting the signals from the cable-powered device from the line side of the apparatus to the isolated side of the apparatus via a signal-isolation transformer located between the line side of the apparatus and the isolated side of the apparatus;
processing, on the isolated side of the apparatus, the signals from the cable-powered device;
converting an AC power signal on the isolated side of the apparatus into a transformed AC power signal on the line side of the apparatus via a power-isolation transformer located between the line side of the apparatus and the isolated side of the apparatus;
converting, on the line side of the apparatus, the transformed AC power signal into a cable power signal;
supplying the cable power signal to the cable in order to power the cable-powered device; and
determining, on the isolated side of the apparatus, that the cable-powered device is connected to the cable based on signals received at the isolated side of the apparatus from the line side of the apparatus via the power-isolation transformer.

* * * * *